United States Patent
Kim et al.

(10) Patent No.: US 9,720,552 B2
(45) Date of Patent: Aug. 1, 2017

(54) TOUCH PANEL INCLUDING A CONDUCTIVE POLYMER LAYER

(71) Applicant: Samsung Display Co., Ltd., Yongin-si (KR)

(72) Inventors: Jung-Yun Kim, Cheonan-si (KR); Sung Ku Kang, Suwon-si (KR); Byeong-Jin Lee, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 14/940,835

(22) Filed: Nov. 13, 2015

(65) Prior Publication Data

US 2016/0313826 A1 Oct. 27, 2016

(30) Foreign Application Priority Data

Apr. 27, 2015 (KR) .................. 10-2015-0059134

(51) Int. Cl.
*G06F 3/044* (2006.01)

(52) U.S. Cl.
CPC .... *G06F 3/044* (2013.01); *G06F 2203/04111* (2013.01)

(58) Field of Classification Search
None
See application file for complete search history.

(56) References Cited

U.S. PATENT DOCUMENTS

| 8,917,250 B2 | 12/2014 | Kim et al. | |
|---|---|---|---|
| 2011/0310053 A1 | 12/2011 | Kim et al. | |
| 2012/0062505 A1* | 3/2012 | Kim | B82Y 15/00 |
| | | | 345/174 |
| 2013/0162547 A1* | 6/2013 | Yoo | G06F 3/044 |
| | | | 345/173 |
| 2015/0028897 A1* | 1/2015 | Koo | G01R 27/2605 |
| | | | 324/690 |
| 2015/0070305 A1* | 3/2015 | Seo | G06F 3/0412 |
| | | | 345/174 |
| 2015/0070309 A1* | 3/2015 | Kang | G06F 3/044 |
| | | | 345/174 |
| 2015/0097802 A1* | 4/2015 | Kim | G06F 3/044 |
| | | | 345/174 |

FOREIGN PATENT DOCUMENTS

| KR | 10-2011-0137576 | 12/2011 |
|---|---|---|
| KR | 10-2013-0027307 | 3/2013 |
| KR | 10-2014-0029118 | 3/2014 |
| KR | 10-2014-0104581 | 8/2014 |

* cited by examiner

*Primary Examiner* — David D Davis
(74) *Attorney, Agent, or Firm* — H.C. Park & Associates, PLC

(57) ABSTRACT

A touch panel includes a substrate including a touch area and a non-touch area adjacent to the touch area, a conductive polymer layer disposed on the substrate, and a touch sensor unit disposed between the conductive polymer layer and the touch area of the substrate. The conductive polymer layer includes a polymer wiring pattern disposed in the non-touch area of the substrate and includes a conductive polymer connected to the touch sensor unit.

9 Claims, 4 Drawing Sheets

TOUCH PANEL INCLUDING A CONDUCTIVE POLYMER LAYER

CROSS-REFERENCE TO RELATED APPLICATION

This application claims priority from and the benefit of Korean Patent Application No. 10-2015-0059134, filed on Apr. 27, 2015, which is hereby incorporated by reference for all purposes as if fully set forth herein.

BACKGROUND

Field

Exemplary embodiments relates to a touch panel.

Discussion of the Background

Touch panels are apparatuses that recognize a touch by a stylus pen or a user's finger. Touch panels may be disposed on a display panel (e.g., an organic light emitting diode display and a liquid crystal display device) and are used to input a signal to a display device. A touch panel may include a substrate and a touch sensor unit that is positioned on the substrate to recognize a touch.

Consumers want display devices (e.g., smartphones, tablets, and laptops) to be convenient and generate high-resolution images. Thus, researchers have started to develop flexible substrates for use in a flexible display device to increase the convenience for the user and to create high-resolution displays. However, touch-capable flexible display devices may require flexible touch panels.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a flexible touch panel that suppresses a delay of a signal.

Exemplary embodiments also provide a touch panel that protects a touch sensor unit from an external interference.

Additional aspects will be set forth in the detailed description which follows, and, in part, will be apparent from the disclosure, or may be learned by practice of the inventive concept.

An exemplary embodiment discloses a touch panel that includes a substrate including a touch area and a non-touch area adjacent to the touch area, a conductive polymer layer disposed on the substrate, and a touch sensor unit disposed between the conductive polymer layer and the touch area of the substrate. The conductive polymer layer includes a polymer wiring pattern disposed in the non-touch area of the substrate and includes a conductive polymer connected to the touch sensor unit.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION

Figure 1:
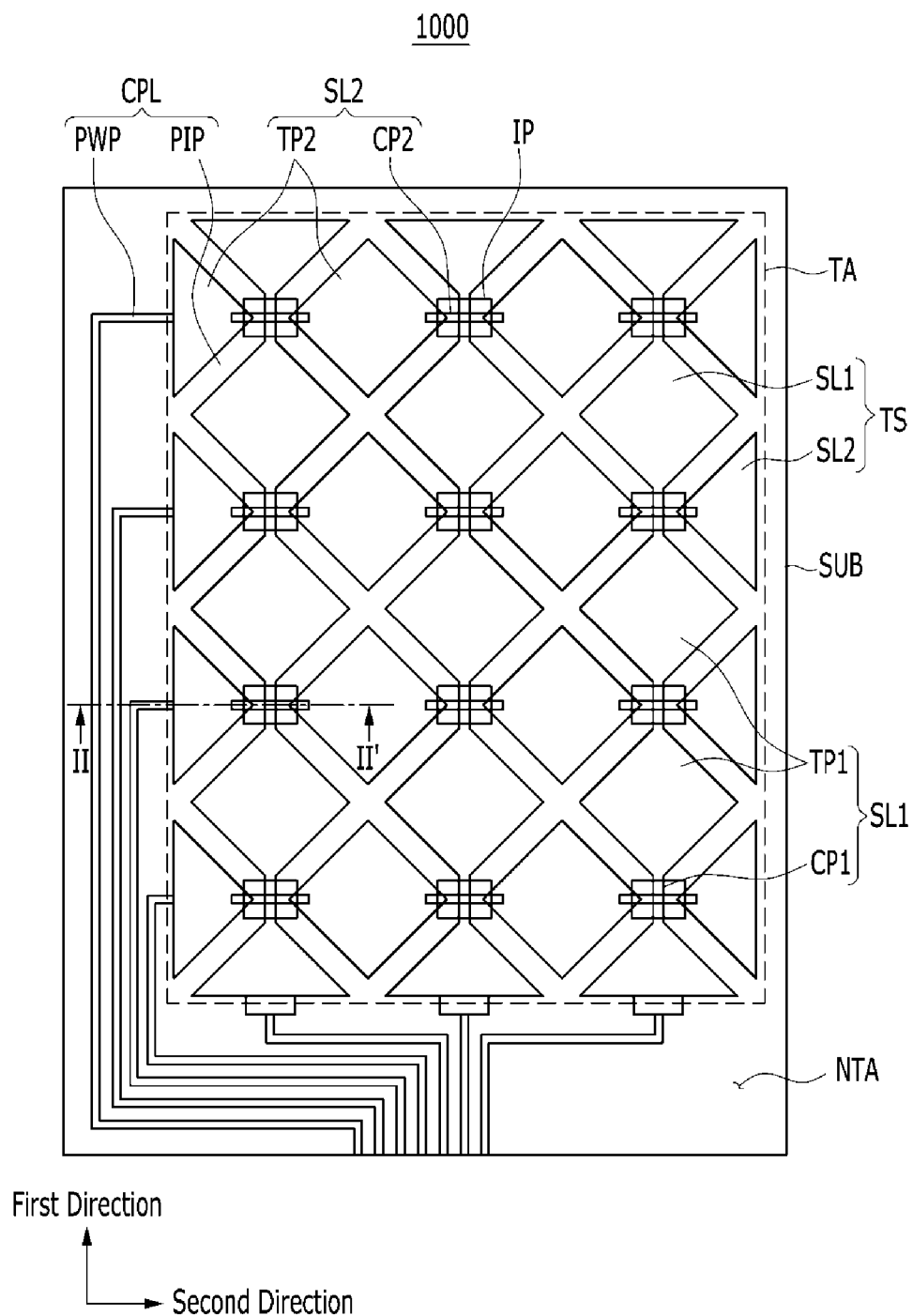
FIG. 1 is a plan view illustrating a touch panel according to an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms "first," "second," etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. As such, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Hereinafter, a touch panel according to an exemplary embodiment will be described with reference to FIG. 1 and FIG. 2. The touch panel may be applied to a display panel displaying an image. The display panel may include various display devices such as liquid crystal displays (LCDs), plasma displays (PDs), field emission displays (FEDs), electrophoretic displays (EPDs), and electrowetting displays (EWDs).

FIG. 1 is a plan view illustrating a touch panel according to an exemplary embodiment. FIG. 2 is a cross-sectional view taken along section line II-II' of FIG. 1.

Figure 2:
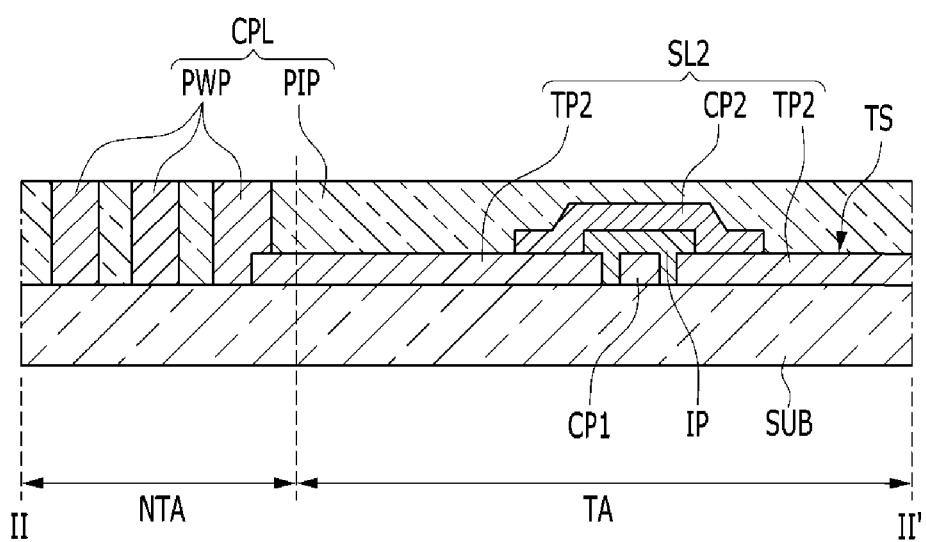
FIG. 2 is a cross-sectional view taken along section line II-II' of FIG. 1.

As illustrated in FIGS. 1 and 2, a touch panel 1000 according to an exemplary embodiment recognizes a touch. The touch panel 1000 may include a substrate SUB, a touch sensor unit TS, and a conductive polymer layer CPL. The touch panel 1000 may include a touch controller (not illustrated) that is formed in a flexible printed circuit board (FPCB), a printed circuit board (PCB), or the like. The touch controller may be connected to a polymer wiring pattern PWP of the conductive polymer layer CPL. The touch controller may digitize an electrical analog signal transmitted from the touch panel 1000 into a digital signal using a converter, and the like to calculate a particular location of a touch from a user (i.e., touch information).

The substrate SUB may be rigid or flexible. The substrate SUB may include an organic material and/or an inorganic material. For example, the substrate may include an inorganic material such as glass and/or a metal (e.g., stainless steel). The substrate SUB may be also be stretchable, foldable, bendable, or rollable. The substrate SUB may be flexible, stretchable, foldable, bendable, or rollable such that the entire touch panel 1000 may be flexible, stretchable, foldable, bendable, or rollable. In an alternative embodiment, the substrate SUB may be rigid or partially rigid (i.e., sections of the substrate are rigid and other sections are flexible).

The substrate SUB may include a touch area TA recognizing a touch and a non-touch area NTA adjacent to the touch area TA. The touch area TA of the substrate SUB may be positioned at a central portion in a plate surface of the substrate SUB. However, the touch area TA not limited to that particular position and may be positioned at an outside portion of the plate surface of the substrate SUB. The non-touch area NTA of the substrate SUB may enclose the touch area TA. However, the non-touch area NTA of the substrate SUB is not limited to that particular position and may be adjacent to the touch area TA.

The touch sensor unit TS may be a portion of the touch panel 1000 that directly recognizes a touch. The touch sensor unit TA may be transparently formed on the plate surface of the substrate SUB. The touch sensor unit TS may be positioned in the touch area TA of the substrate SUB. The touch sensor unit TS may be a capacitive type substrate.

The touch sensor unit TS may include a first signal line SL1 that extends in a first direction on the substrate SUB. The first signal line SL1 may be connected to the polymer wiring pattern PWP of the conductive polymer layer CPL. The touch sensor unit TS may include a second signal line SL2 that extends in a second direction (i.e., a direction substantially perpendicular and intersecting the first direction). The second signal line SL2 may be connected to the polymer wiring pattern PWP.

Multiple first signal lines SL1 may be sequentially disposed in the second direction. The first signal line SL1 may include a first touch pad part TP1 and a first connection part CP1. Multiple first touch pad parts TP1 of a first signal line SL1 may be disposed to be separated from each other in the first direction. The first touch pad part TP1 may have a rhombus shape in a two dimension but is not limited to the rhombus shape in two dimensions. In two dimensions, the first touch pad part TP1 may have a triangle shape, a quadrangle shape, a pentagon shape, a hexagon shape, a heptagon shape, an octagon shape, a circle shape, and/or an oval shape. The first touch pad part TP1 may include transparent conductive materials such as silver nanowire (AgNW), indium tin oxide (ITO), and indium zinc oxide (IZO). The first touch pad part TP1 may include a metal mesh. The first touch pad part TP1 may include a conductive polymer such as poly (3,4-ethylenedioxythiophene) polystyrene sulfonate (PEDOT:PSS). The first touch pad part TP1 may include any other suitable material.

The first connection part CP1 may connect between the first touch pad parts TP1. More specifically, the first connection part CP1 may connect between adjacent first touch pad parts TP1. The first touch pad part TP1 and the first connection part CP1 may be integrally formed. However, the first touch pad part TP1 and the first connection part CP1 may not be integrally formed and may include different materials. The first connection part CP1 may intersect the second connection part CP2 and may be insulated from the second connection part CP2.

Multiple second signal lines SL2 may be sequentially disposed in the first direction. Multiple second touch pad parts TP2 of a second signal line SL2 may be disposed to be spaced apart from each other in the second direction. The second touch pad part TP2 may have a rhombus shape in two dimensions, but the second touch pad part TP2 is not limited to the rhombus shape in two dimensions. In two dimensions, the second touch pad part TP2 may include a triangle shape, a quadrangle shape, a pentagon shape, a hexagon shape, a heptagon shape, an octagon shape, a circle shape, and/or an oval shape. The second touch pad part TP2 may include a transparent conductive material such as silver nanowire (AgNW), indium tin oxide (ITO), and indium zinc oxide (IZO). The second touch pad part TP2 may include a metal mesh. The second touch pad part TP2 may include a conductive polymer such as poly (3,4-ethylenedioxythiophene) polystyrene sulfonate (PEDOT:PSS). The second touch pad part TP2 may include any other suitable material.

The second connection part CP2 may connect between the second touch pad parts TP2. More specifically, the second connection part CP2 may connect between adjacent second touch pad parts TP2. The second touch pad part TP2 and the second connection part CP2 may include different materials but are not limited to different materials. The second touch pad part TP2 and the second connection part CP2 be integrally formed and may include the same materials. The second connection part CP2 may be insulated from and may intersect with the first connection part CP1.

As such, the first signal line SL1 and the second signal line SL2 may intersect each other while being insulated from each other. The portion at which the first signal line SL1 and the second signal line SL2 intersect with each other may be interposed with the insulating pattern IP. The insulating pattern IP may include at least one of silicon oxide ($SiO_x$) and silicon nitride ($SiN_x$) but is not limited to these materials. The insulating pattern IP may be formed in the form of the insulating layer. The first signal line SL1 and the second signal line SL2 may be positioned on the same layer or different layers on the substrate SUB.

As described above, the conductive polymer layer CPL may be positioned on the substrate SUB having the touch sensor unit TS formed between the conductive polymer layer CPL and the substrate SUB. In other words, the conductive polymer layer CPL may cover the touch sensor unit TS. The conductive polymer layer CPL may include the polymer wiring pattern PWP and a polymer insulating pattern PIP that are integrally formed with each other.

The polymer wiring pattern PWP may be positioned in the non-touch area NTA of the substrate SUB and may be connected to the touch sensor unit TS. Multiple polymer wiring patterns PWP may be connected to the first signal lines SL1 of the touch sensor TS. Multiple polymer wiring patterns PWP, but different polymer wiring patterns PWP, may be connected to the second signal lines SL2 of the touch sensor unit TS. The polymer wiring patterns PWP may include a conductive polymer. Here, the conductive polymer may include poly (3,4-ethylenedioxythiophene) polystyrene sulfonate (PEDOT:PSS) but is not limited to such a material. The polymer wiring patterns may further include poly ethylene glycol (PEG) and poly ethylene oxide (PEO).

The polymer insulating pattern PIP may be integrally formed with the polymer wiring pattern PWP and may be positioned in the touch area TA and the non-touch area NTA of the substrate SUB. The polymer insulating pattern PIP positioned in the non-touch area NTA may be positioned between polymer wiring patterns PWPs and may connect adjacent polymer wiring patterns PWPs. The polymer insulating pattern PIP positioned in the touch area TA may cover the touch sensor unit TS and may include a non-conductive polymer. Here, the non-conductive polymer may include poly (3,4-ethylenedioxythiophene) polystyrene sulfonate (PEDOT:PSS) but the polymer insulating pattern PIP is not limited to such materials. The polymer insulating pattern PIP may further include poly ethylene glycol (PEG) and poly ethylene oxide (PEO). The polymer insulating pattern PIP may be formed with lower conductivity or lost conductivity by applying a particular solution or a light source to a desired area of the polymer insulating pattern PIP in the conductive polymer layer CPL by known various methods. The polymer insulating pattern PIP may be formed as a single layer with the conductive polymer layer CPL.

The polymer insulating pattern PIP may include the non-conductive polymer (having removed conductivity) and thus has a higher light transmittance than the polymer wiring pattern PWP including the conductive polymer. Further, the polymer insulating pattern PIP may include the non-conductive polymer and thus has lower electric conductivity than the polymer wiring pattern PWP including the conductive polymer.

In the touch panel 1000 configured as described above, when a voltage is sequentially applied to the first signal lines SL1 and the second signal lines SL2 by the polymer wiring pattern PWP of the conductive polymer layer CPL, capacitance may be formed between the first signal lines SL1 and the second signal lines SL2, respectively. When a touch is performed on the touch sensor unit TS (e.g., when a user's finger touches the touch panel 1000), a capacitance of a touched position is changed and thus the voltage applied to the first signal line SL1 or the second signal line SL2 is changed. As such, the touch sensor unit TS of the touch panel 1000 may sense the position the touch is performed.

As described above, in the touch panel 1000 according to an exemplary embodiment, the polymer wiring pattern PWP of the conductive polymer layer CPL connected to the touch sensor unit TS may recognize a touch and may include the conductive polymer, thereby improving the general flexibility. In particular, the polymer wiring pattern PWP may be positioned in the non-touch area NTA of the substrate SUB such that the substrate may be more flexible in the non-touch area NTA than the touch area TA.

Further, in the touch panel 1000 according to an exemplary embodiment, the polymer wiring pattern PWP is positioned in the non-touch area NTA of the substrate SUB and includes the transparent conductive polymer. The inclusion of the transparent conductive polymer may suppress the polymer wiring pattern PWP positioned in the non-touch area NTA of the touch panel 1000 from being visualized. In other words, the transparent touch panel 1000 is provided over the touch area TA and the non-touch area NTA of the substrate SUB.

Further, in the touch panel 1000 according to an exemplary embodiment, the touch sensor unit TS is covered with the polymer insulating pattern PIP of the conductive polymer layer CPL. The polymer insulating pattern PIP may suppress the touch sensor unit TS from being damaged due to the external interference or from reacting with gases such as external oxide and nitrogen.

Further, in the touch panel 1000 according to an exemplary embodiment, the conductive polymer layer CPL of the touch sensor unit TS includes the polymer wiring pattern PWP connected to the touch sensor unit TS and the polymer insulating pattern PIP covering the touch sensor unit TS. The polymer wiring pattern PWP and the polymer insulating pattern PIP may protect the touch sensor unit TS to form the conductive polymer layer CPL using a single process, thereby simultaneously performing the connection of the touch sensor unit TS and the protection of the touch sensor unit TS. In other words, cost and time are saved in manufacturing the touch panel 1000. In addition, the reliability of the touch panel 1000 is improved.

Hereinafter, a touch panel according to an exemplary embodiment will be described with reference to FIGS. 3 and 4. Hereinafter, components different from those of the touch panel according to the exemplary embodiments described above will be described.

Figure 3:
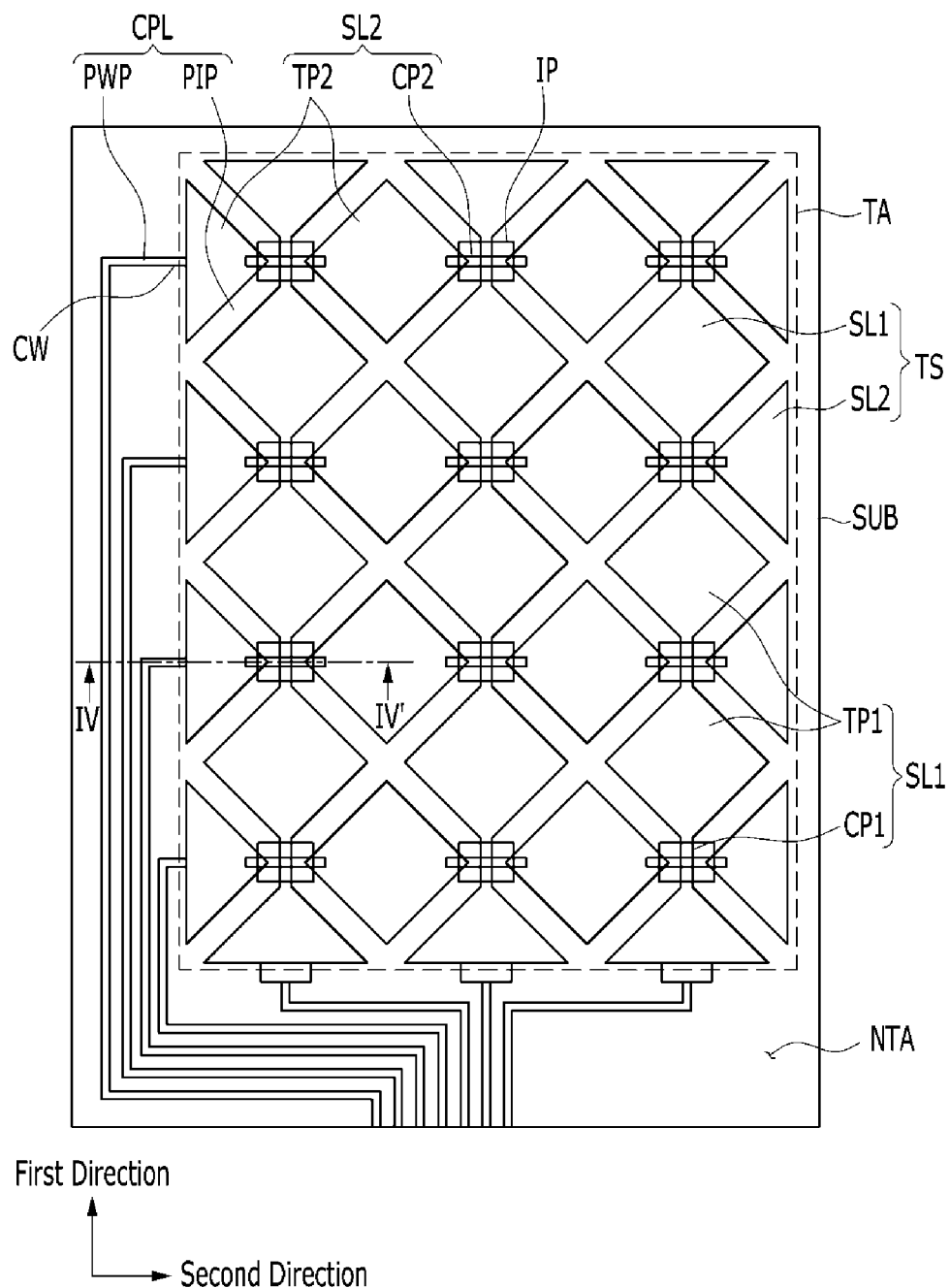
FIG. 3 is a plan view of a touch panel according to an exemplary embodiment.

FIG. 3 is a plan view of a touch panel according to an exemplary embodiment. FIG. 4 is a cross-sectional view taken along section line IV-IV' of FIG. 3.

Figure 4:
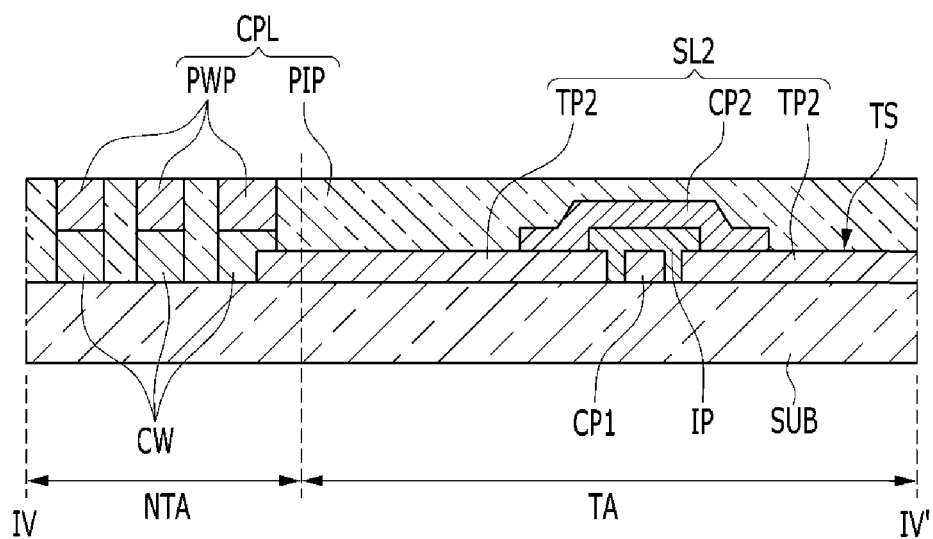
FIG. 4 is a cross-sectional view taken along section line IV-IV' of FIG. 3.

As illustrated in FIGS. 3 and 4, the touch panel 1000 according to an exemplary embodiment includes a substrate SUB, a touch sensor unit TS, a conductive polymer layer CPL, and a connection wiring CW.

Multiple connection wirings CWs may be positioned in the non-touch area NTA of the substrate SUB. Each connection wiring CW each may directly connected to the touch sensor unit TS. More specifically, the connection wirings CW may be connected to the first signal lines SL1 and the second signal lines SL2 of the touch sensor unit TS. The connection wirings CW may include metals such as gold (Au), silver (Ag), and/or copper (Cu). The connection wirings CW may include transparent conductive materials such as silver nanowire (AgNW), indium tin oxide (ITO), and/or indium zinc oxide (IZO). The connection wirings CW may include a metal mesh. The connection wirings CW may include conductive polymers such as poly (3,4-ethylenedioxythiophene) polystyrene sulfonate (PEDOT:PSS). The conductive wirings CW may include any other suitable material. The connection wirings CW may be formed on the substrate SUB using a different process from or the same process as the touch sensor unit TS.

The polymer wiring pattern PWP of the conductive polymer layer CPL may be positioned in the non-touch area NTA of the substrate SUB having the connection wiring CW formed between the polymer wiring pattern PWP and the substrate SUB. In other words, the polymer wiring pattern PWP may cover the connection wiring CW. The polymer wiring pattern PWP and the connection wiring CW may each have the same shape in two dimensions but the polymer wiring pattern PWP and the connection wiring CW are not limited to such shapes or structures. The polymer wiring pattern PWP and the connection wiring CW may have different forms in two dimensions.

As described above, in the touch panel 1000 according to an exemplary embodiment, the touch sensor unit TS may be covered with the polymer insulating pattern PIP of the conductive polymer layer CPL and at the connection wiring CW may be covered with the polymer wiring pattern PWP of the conductive polymer layer CPL to suppress the touch sensor unit TS and the connection wiring CW from being damaged due to the external interference or from reacting with gases such as external oxide and nitrogen. In other words, the touch panel 1000 described and illustrated with reference to FIGS. 3 and 4 may have improved handling reliability.

Further, in the touch panel 1000 according to an exemplary embodiment, the connection wiring CW may be covered with the polymer wiring pattern PWP including the conductive polymer to suppress the delay of the signal supplied to the touch sensor unit TS through the connection wiring CW. Thus, the touch panel 1000 in which the delay of the signal for the touch sensor unit TS is generally suppressed is provided.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A touch panel, comprising:
    a substrate comprising a touch area and a non-touch area adjacent to the touch area;
    a conductive polymer layer disposed on the substrate and comprising a polymer insulating pattern and a polymer wiring pattern comprising a conductive polymer; and
    a touch sensor unit disposed between the conductive polymer layer and the touch area of the substrate,
    wherein the polymer wiring pattern is disposed in the non-touch area of the substrate and connected to the touch sensor unit,
    wherein the conductive polymer layer is disposed directly on the touch sensor unit.

2. The touch panel of claim 1, wherein the conductive polymer layer is disposed directly on the substrate.

3. The touch panel of claim 1, wherein the polymer insulating pattern is disposed in the touch area of the substrate and comprises a non-conductive polymer covering and disposed directly on the touch sensor unit.

4. The touch panel of claim 1, wherein the polymer wiring pattern contacts the touch sensor unit.

5. The touch panel of claim 3, wherein a light transmittance of the polymer insulating pattern is higher than a light transmittance of the polymer wiring pattern.

6. The touch panel of claim 3, wherein an electric conductivity of the polymer insulating pattern is lower than an electric conductivity of the polymer wiring pattern.

7. The touch panel of claim 1, further comprising a connection wiring disposed in the non-touch area of the substrate and directly connected to the touch sensor unit.

8. The touch panel of claim 7, wherein the polymer wiring pattern covers the connection wiring.

9. The touch panel of claim 1, wherein the touch sensor unit comprises:
    first touch pad parts disposed on the substrate to be spaced apart from each other in a first direction;
    a first connection part connecting at least two first touch pad parts;
    second touch pad parts disposed on the substrate to be spaced apart from each other in a second direction intersecting the first direction; and
    a second connection part being insulated from and intersecting with the first connection part and connecting at least two second touch pad parts.

* * * * *